(12) United States Patent
Watson

(10) Patent No.: US 9,974,341 B2
(45) Date of Patent: May 22, 2018

(54) CONVENIENT SMOKING DEVICE VAPORIZER WITH IMPROVED AIR FLOW

(71) Applicant: Zipline Innovations, LLC, Denver, CO (US)

(72) Inventor: James Matthew Watson, Katy, TX (US)

(73) Assignee: Zipline Innovations, LLC, Denver, CO (US)

( * ) Notice: Subject to any disclaimer, the term of this patent is extended or adjusted under 35 U.S.C. 154(b) by 0 days. days.

(21) Appl. No.: 15/429,893

(22) Filed: Feb. 10, 2017

(65) Prior Publication Data

US 2017/0231279 A1 Aug. 17, 2017

Related U.S. Application Data

(60) Provisional application No. 62/294,553, filed on Feb. 12, 2016.

(51) Int. Cl.
- *A24F 13/00* (2006.01)
- *A24F 47/00* (2006.01)
- *H01M 10/42* (2006.01)

(52) U.S. Cl.
CPC ......... *A24F 47/008* (2013.01); *H01M 10/425* (2013.01)

(58) Field of Classification Search
CPC ..................................... A24F 47/008
USPC ................................. 131/173–330
See application file for complete search history.

(56) References Cited

U.S. PATENT DOCUMENTS

| | | | |
|---|---|---|---|
| 2012/0042884 A1* | 2/2012 | Mukaddam | A24F 1/30 131/173 |
| 2016/0183592 A1* | 6/2016 | Liu | H05B 1/0244 131/329 |
| 2016/0353800 A1* | 12/2016 | Di Carlo | A24F 47/008 |
| 2017/0099873 A1* | 4/2017 | Benjamignan | A24F 1/30 |
| 2017/0105449 A1* | 4/2017 | Hearn | A24F 47/008 |

* cited by examiner

Primary Examiner — Phuong Dinh
(74) Attorney, Agent, or Firm — Seyfarth Shaw LLP

(57) ABSTRACT

A convenient smoking device is disclosed with a main body having a battery unit and a pipe that are parallel to each other. A first end of the main body includes a battery cap and a first seal ring, and may be detachably fixed to the first end of the main body by a nut. A fixing cap can also be provided on the main body, as well as a second seal ring for connecting the pipe with an atomizer. Both of the second seal ring and the fixing cap are fixed to the second end of the main body by a upper cap.

16 Claims, 5 Drawing Sheets

CONVENIENT SMOKING DEVICE VAPORIZER WITH IMPROVED AIR FLOW

BACKGROUND

Related Technical Field

The current invention relates to electronic smoking device technologies, especially, a convenient smoking device.

Background

Electronic cigarettes are consumed by heating a tobacco paste in liquid or solid forms (or other smoking products), and transforming it into a gaseous form by heating in an atomizer. An atomizers to existing electronic cigarettes is provided to the top of batteries, and located between a nozzle and a battery rod, and a heating part is provided within the atomizer. When using the exiting electronic cigarette, first the atomizer and the battery rod are dissembled from each other, then the tobacco paste is provided into the atomizer by a injecting bottle or a scoop, next the atomizer is tightly connected to the battery rod. The electronic cigarette of such formation has complicated operations in use. Moreover, because the atomizer and a heating wire are provided within a main body, which leads to difficulties in cleaning, and residual tobacco paste and other impurities may cause clogging in a pore. If a storage volume for the tobacco paste is limited, there is a need for multiple purveyance of the tobacco paste to the atomizer in case of repeated or prolonged smoking. Nevertheless, the tobacco paste in the solid forms may be liquefied by heating in the atomizer, and may flow into the pore or even flow out from the nozzle. Said tobacco paste may attach to walls of the pore when cooling down, which is difficult to clean, and cause wastes. On the other hand, in order to prevent the tobacco paste flowing into the pore when using the tobacco paste in the liquid forms, the electronic cigarette could only be used vertically, which lead to greater inconvenience.

BRIEF DESCRIPTION OF THE PRESENT INVENTION

One objection of the present invention is to provide a convenient smoking device that has a electric heating wire provided at a top thereof, is free of feeding tobacco paste into an atomizer, is easy to operate, is easy to clean, is convenient to use, and is free of clogging.

To realize the above objection, the present invention introduces following:

The convenient smoking device, comprising a main body; a battery unit and a pipe that are parallel to each other and are both provided inside said main body; a first end of said main body is provided with a battery cap for securing a bottom of the battery unit and a first seal ring connecting the pipe to a nozzle. Said battery cap may be detachably fixed to the first end of the main body by a nut. A second end of the main body is provided with a fixing cap for securing the battery unit and a second seal ring connecting the pipe to the atomizer, both of said second seal ring and said fixing cap are fixed to the second end of the main body by a upper cap. Atop of said upper cap connects to the atomizer, wherein the atomizer's electric heating wire is connected with the battery unit. Said heating wire's heating region extends out of the atomizer at a first side that is away from the battery unit.

Preferably, said atomizer comprises a top of the atomizer which connected to the upper cap, an electrode is provided to the top of the atomizer and connects the electric heating wire with the battery unit, wherein said electrode is fixed to the top of the atomizer by a non-conductive ring. A first side of said top of the atomizer, which is away from the battery unit, is connected to a screw rod seat by threading. A connecting portion is provided out of said screw rod seat. A ceramic seat is provided and connected to an opposite end of the screw rod seat, wherein the electric heating wire is fixed to the inside of the ceramic seat. Said electric heating wire's heating region either extends out of an end of the ceramic seat or stops thereat.

Preferably, a protective cover is provided outside of said atomizer. Said protective cover has a hollow cylindrical structure and said protective cover is secured to the top of the atomizer.

Preferably, said top of the atomizer and said protective cover cooperate each other by plugging.

Preferable, the cross-section of the main body is elliptical-shaped.

Preferably, a circuit board for buck protections, short circuit protections, and/or working time limitations is provide in between the battery unit and the electrode. Said circuit board is fixed to the fixing cap.

Preferably, said electric heating wire has a helical structure.

Preferably, said battery cap is provided with a rotary handle at its side away from the nut. Said rotary handle's outer surface is provided with knurled prints to increase friction.

Preferably, said main body's outer surface is provided with a switch button for controlling the circuit board.

Preferably, said first seal ring has at least two circumferential extrusions at a first end where the seal ring connecting to the nozzle, wherein the extrusions separate a smoking channel formed by the nozzle, the first seal ring and the pipe from a space where the battery cap locates.

The present invention is advantaged at:

The battery unit of the present invention is placed at the middle of the convenient smoking device, its ends are provided with the nozzle and the atomizer, respectively, wherein the electric heating wire of the atomizer extending out of the atomizer. When smoking, the electric heating wire may be inserted into the tobacco paste (external), and smoke may be consumed by suction from the nozzle. Thus the complicate operation of existing electronic cigarette may be avoid. Moreover, the convenient smoking device does not require providing of the tobacco paste or other smoking products thereinto, thus it is easy to clean, and may be operated at any angle, thus provides more convenience to smokers.

DESCRIPTION OF DRAWINGS

For better understanding of the present invention, detailed descriptions are provided with figures hereafter.

Figure 1:
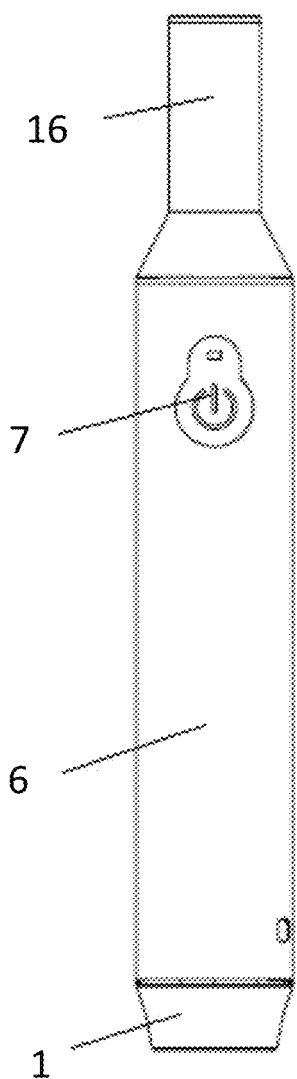
FIG. 1 is a structural drawing of a convenient smoking device of the present invention.

Labels in the drawings are: 1—nozzle; 2—battery cap; 3—nut; 4—first seal ring; 5—pipe; 6—main body; 7—switch button; 8—second seal ring; 9—upper cap;

10—battery unit; 11—circuit board; 12—fixing cap; 13—non-conductive ring; 14—electrode; 15—atomizer; 16—protective cover; 17—top of atomizer; 18—screw rod seat; 19—adapter; 20—ceramic seat; 21—electric heating wire; 22, rotary handle.

DETAILED DESCRIPTION OF EMBODIMENTS

Figure 2:
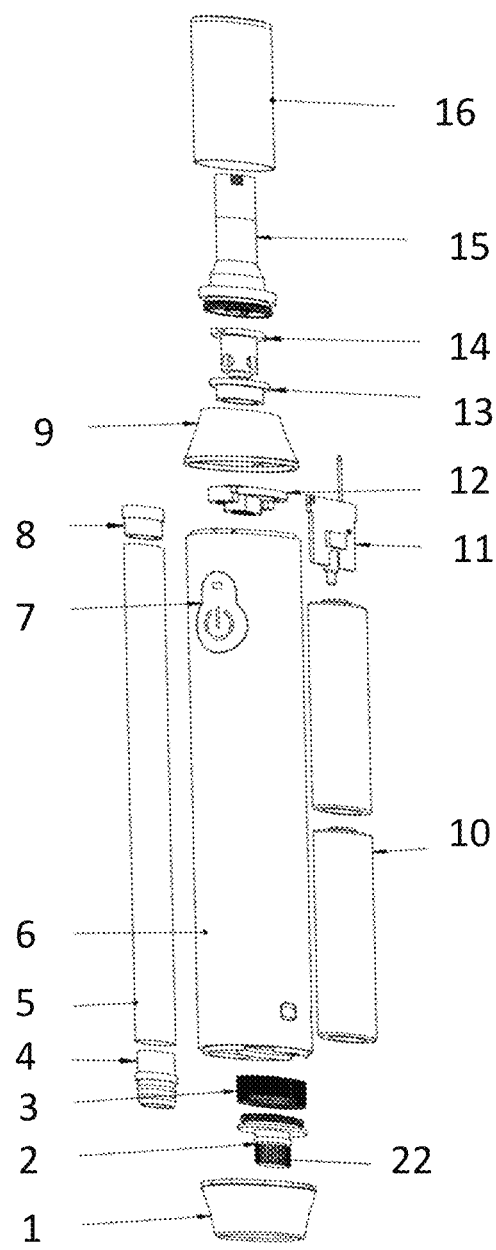
FIG. 2 is a detailed illustration to a convenient smoking device of the present invention.

Referring to FIGS. 1 & 2, a convenient smoking device, comprising a main body 6, a battery unit 10 and a pipe 5 that are parallel to each other and are provided inside said main body. Said battery unit 10 has two sub-units and are connected in series. A first end of said main body 6 is provided with a battery cap 2 for securing a bottom of the battery unit 10 and a first seal ring 4 is provided for connecting the pipe 5 with a nozzle 1. Said battery cap 2 may be detachably fixed to the first end of the main body by a nut 3. A second end of the main body 6 is provided with a fixing cap 12 for securing the battery unit 10 and a second seal ring 8 for connecting the pipe 5 with an atomizer 15, both of said second seal ring 8 and said fixing cap 12 are fixed to the second end of the main body by a upper cap 9. A top of said upper cap 9 connects to the atomizer 15. The atomizer's electric heating wire 21 is connected with the battery unit 10. Said heating wire's heating region extends out of the atomizer at a first side that is away from the battery unit 10.

According to one embodiment of the present invention, the battery unit is provided at the middle of the convenient smoking device. The nozzle and the atomizer are provided at each of the battery unit's two ends, respectively, and the electric heating wire of the atomizer extends out of the atomizer.

When smoking, the electric heating wire is inserted into a tobacco paste, and smokes are inhaled by sucking force conducted from the nozzle.

Figure 3:
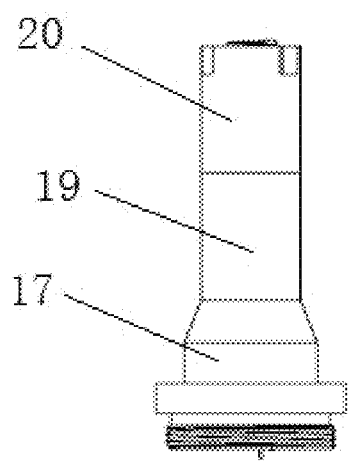
FIG. 3 is a structural drawing of a atomizer of a convenient smoking device (with out a protective cover) of the present invention.
Figure 4:
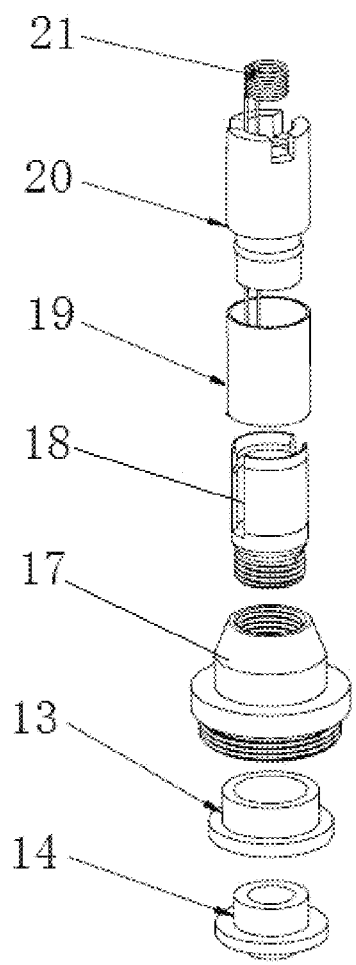
FIG. 4 is a detailed illustration to an atomizer of a convenient smoking device (with out a protective cover) of the present invention.

Referring to FIGS. 3 & 4, according to one embodiment of the present invention, the atomizer 15 comprises a top of the atomizer 17 which connected to the upper cap 9. Inside the top of the atomizer 17, an electrode 14 is provided which connects the electric heating wire 21 with the battery unit 10, wherein said electrode 14 is fixed to the top of the atomizer 17 by a non-conductive ring 13. A first side of said top of the atomizer 17, which is away from the battery unit 10, connects to a screw rod seat 18 by threading. A connecting portion 19 is provided outside said screw rod seat 18. A ceramic seat 20 is provided and connected to an opposite end of the screw rod seat 18, wherein the electric heating wire 21 is fixed to the inside of the ceramic seat 20. Said electric heating wire's heating region either extends out of an end of the ceramic seat 20 or stops thereat for heating the tobacco paste provided externally.

According to one embodiment of the present invention, there is no storage for the tobacco paste provided in the atomizer. Therefore there is no need for clearing the tobacco paste after use.

According to one embodiment of the present invention, a protective cover 16 is provided outside of said atomizer 15. Said protective cover 16 has a hollow cylindrical structure and it may be secured to the top of the atomizer 17, wherein said protective cover 16 and the top of the atomizer 17 may cooperate each other by plugging. Said arrangement effectively prevent scalding to fingers when smoking.

Figure 5:
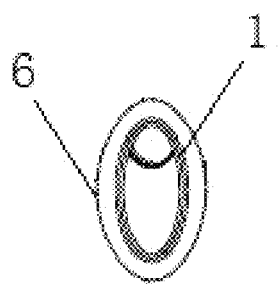
FIG. 5 is a side view of a convenient smoking device from an aspect from a nozzle.

Referring to FIG. 5, according to one embodiment of the present invention, the cross-section of the main body is elliptical-shaped. The pipe 5 and the battery unit 10 are provided along an axis direction of the main body 6. And, said pipe 5 and battery unit 10 are provided at the longitudinal axis of the elliptical cross-section of the main body 6. Having the cross-section being elliptical-shaped would increase aesthetic value while being convenient for handling.

According to one embodiment of the present invention, a circuit board 11 for buck protections, short circuit protections, and/or working time restrictions is provided in between the battery unit 10 and the electrode 14. Said circuit board is fixed to the fixing cap 12. Providing the circuit board 11 may improve the convenient smoking device's safety, as well as its user-oriented degrees.

According to one embodiment of the present invention, said electric heating wire 21 has a helical structure for improved heating effects and operative performance.

According to one embodiment of the present invention, said battery cap 2 is provided with a rotary handle 22 at its side away from the nut 3. Said rotary handle's outer surface is provided with knurled prints to increase friction. The knurled prints also help when twisting the battery cap 2 for securing or taking away batteries.

According to one embodiment of the present invention, said main body's outer surface is provided with a switch button 7 for switching on/off the circuit board 11.

According to one embodiment of the present invention, said first seal ring 4 has at least two circumferential extrusions at a first end where the seal ring connecting to the nozzle 1, wherein the extrusions separate a smoking channel, formed by the nozzle 1, the first seal ring 4 and the pipe 5, from a space where the battery cap 2 locates. The arrangement of the extrusions improves air-tightness of space where the smoking channel and the battery cap located, and prevents the smokes from entering the space where the battery cap located.

Embodiments described hereabove are only for the purpose of detailed explanation of the present invention, however the applications of the present invention is not restricted to the above embodiments. Person with skills in this field should understand that any improvement and/or substitution based on the principle and sprite of the present invention shall be covered under the protection of the present invention.

I claim:

1. A convenient smoking device, comprising:
a main body having first and second ends 6, wherein;
a battery unit provided inside the main body; 10 and
a pipe 5 that are parallel to the battery unit and each other are provided inside said the main body, a first end of said main body 6 is provided with;
a nozzle;
an atomizer having a heating wire adapted to heat an object;
a first seal ring connecting the pipe with the nozzle;
a second seal ring connecting the pipe with the atomizer;
a battery cap provided at the first end of the main body, the battery cap 2 for securing coupling a bottom of the battery unit; 10 and a first seal ring 4 for connecting the pipe 5 with a nozzle 1,
a nut detachably coupling the first end of the main body to the battery cap; said battery cap 2 is detachably fixed to the first end of the main body by a nut 3;
a second end of the main body 6 is provided with a fixing cap 12 provided at the second end of the main body, the fixing cap coupling for securing the battery unit 10 and the a second seal ring 8 for connecting the pipe 5 with an atomizer 15;
an upper cap coupling both of said the second seal ring 8 and said the fixing cap 12 are fixed to the second end of the main body by a upper cap 9, a top of the upper cap connecting to the atomizer;

a top of said upper cap 9 connects to the atomizer 15;

said atomizer's electric heating wire 21 is connected with the heating wire being coupled to the battery unit 10, wherein a heating region of the said heating wire's heating region extends out of the atomizer at a first side opposite that is away from the battery unit 10.

2. The convenient smoking device from of claim 1, further comprising: wherein:

the atomizer 15 comprises a top of the atomizer 17 which connected is coupled to the upper cap 9; and further comprising:

an electrode 14 is provided inside the top of the atomizer 17 and connects coupling the electric heating wire 21 with the battery unit 10, wherein said the electrode 14 is fixed is coupled to the top of the atomizer 17 by a non-conductive ring 13;

the first side of said the top of the atomizer 17 connects coupling to a screw rod seat 18 by threading, wherein a connecting portion 19 is provided outside the said screw rod seat 18;

a ceramic seat 20 is provided and connected coupled to an opposite end of the screw rod seat 18, wherein the electric heating wire 21 is fixed coupled to the inside of the ceramic seat 20, and said electric heating wire's heating region either extends out of an end of the ceramic seat 20 or stops thereat.

3. The convenient smoking device from of claim 2, further comprising: a protective cover 16 is provided outside of said the atomizer 15, wherein said the protective cover 16 has includes a hollow cylindrical structure and it may be secured coupled to the top of the atomizer 17.

4. The convenient smoking device of from claim 3, wherein said the protective cover 16 and the top of the atomizer 17 may cooperate each other by plugging are plugged together.

5. The convenient smoking device from of claim 1, wherein a cross-section of the main body is elliptical-shaped.

6. The convenient smoking device from of claim 2, further comprising: a circuit board 11 for buck protection, short circuit protection, and/or working time restriction, the circuit board being is provided in between the battery unit 10 and the electrode 14, wherein said the circuit board is fixed coupled to the fixing cap 12.

7. The convenient smoking device from of claim 3, further comprising: a circuit board 11 for buck protection, short circuit protection, and/or working time restriction, the circuit board being is provided in between the battery unit 10 and the electrode 14, wherein said the circuit board is fixed coupled to the fixing cap 12.

8. The convenient smoking device from of claim 4, further comprising: a circuit board 11 for buck protection, short circuit protection, and/or working time restriction, the circuit board being is provided in between the battery unit 10 and the electrode 14, wherein said the circuit board is fixed coupled to the fixing cap 12.

9. The convenient smoking device of from claim 5, further comprising: a circuit board 11 for buck protection, short circuit protection, and/or working time restriction, the circuit board being is provided in between the battery unit 10 and the electrode 14, wherein said the circuit board is fixed coupled to the fixing cap 12.

10. The convenient smoking device from of claim 6, wherein said the electric heating wire 21 has a helical structure.

11. The convenient smoking device from of claim 7, wherein said the electric heating wire 21 has a helical structure.

12. The convenient smoking device from of claim 8, wherein said the electric heating wire 21 has a helical structure.

13. The convenient smoking device from of claim 9, wherein said the electric heating wire 21 has a helical structure.

14. The convenient smoking device from of claim 1, further comprising: a rotary handle 22 at one side of the battery cap which is located away from the nut 3; Said, an outer surface of the rotary handle's outer surface is being provided with knurled prints to increase friction.

15. The convenient smoking device from of claim 1, further comprising: a switch button 7 for controlling the circuit board 11, wherein the switch button is provided to located at an outer surface of the main body.

16. The convenience smoking device from of claim 1, further comprising: said wherein first seal ring 4 has at least two circumferential extrusions at a first end where thereof where the seal ring is connecting connected to the nozzle 1, and wherein the extrusions isolate a smoking channel, formed by the nozzle 1, the first seal ring 4 and the pipe 5, from a space where the battery cap 2 located is located.

* * * * *